Figures 1, 2, 3, 4:
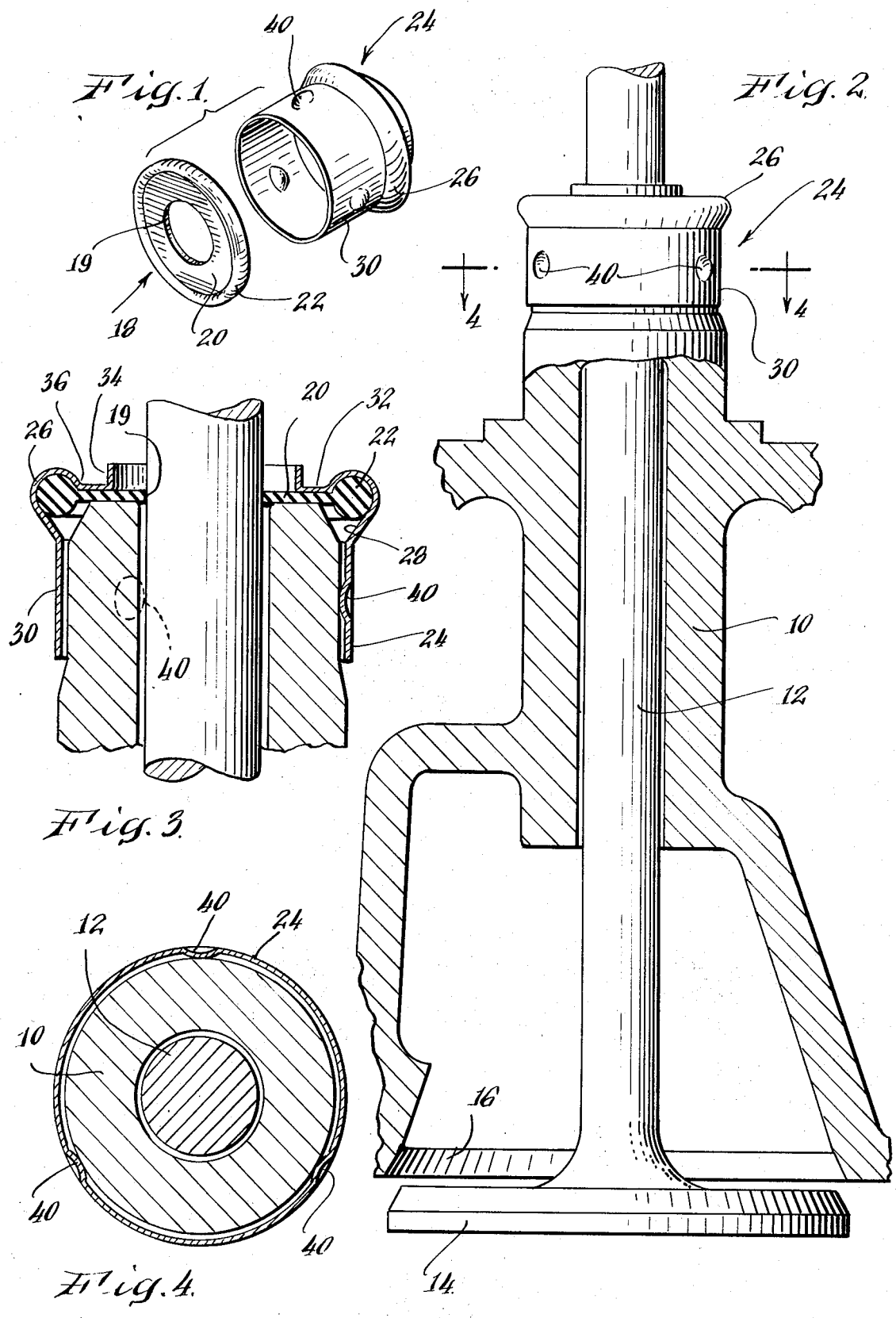

United States Patent [19]
Wilson et al.

[11] 3,771,800
[45] Nov. 13, 1973

[54] VALVE STEM SEAL

[75] Inventors: Donald R. Wilson, Summerville, S.C.; Nicholas P. Flonc, Hamden, Conn.

[73] Assignee: Eagle-Picher Industries, Incorporated, Cincinnati, Ohio

[22] Filed: Aug. 24, 1972

[21] Appl. No.: 283,549

[52] U.S. Cl. ............... 277/187, 277/169, 123/188 P
[51] Int. Cl. ............................................. F16j 15/00
[58] Field of Search ................... 277/186, 187, 181, 277/48, 169; 123/188 P

[56] References Cited
UNITED STATES PATENTS

| | | | |
|---|---|---|---|
| 3,599,992 | 8/1971 | Kammeraad | 277/48 |
| 3,379,445 | 4/1968 | Fisher | 277/178 |
| 2,565,571 | 8/1951 | Naumann | 277/187 |
| 3,268,984 | 8/1966 | Kupchick | 277/184 X |

*Primary Examiner*—Samuel B. Rothberg
*Attorney*—John W. Hoag

[57] ABSTRACT

A two part assembly for providing a seal around a shaft at the end of a guide comprises an annular elastomeric sealing ring having a thin center portion which clings to the shaft and a thicker peripheral bead which is seated in a circular outwardly expanded position of a retainer cap the lower portion of which comprises a skirt adapted to be pressed over the end of the guide, and the upper portion of which extends radially inward part way over the sealing ring and terminates in an edge portion which is angled upwardly away from the thin portion of the sealing ring.

7 Claims, 4 Drawing Figures

VALVE STEM SEAL

FIELD OF THE INVENTION

This invention relates to a two part assembly for providing a seal around a shaft at an end of a guide within which the shaft is reciprocable. One application of the invention is to provide an oil seal around a valve stem at the outer end of a valve stem guide of an internal combustion engine through which the valve stem is reciprocated.

Heretofor valve stem oil seals have been provided which have been cap-like rubber members with an opening in the dome for the valve stem and with a downwardly extending skirt portion to fit around the upper or outer end of the valve stem guide. Such members are unsatisfactory because the portion surrounding the valve stem does not cling tightly to the valve stem. This is especially true when for any reason, such as eccentricity of the valve, there is any cocking of the valve stem within the valve guide. When this occurs, as it frequently does, a gap develops between the valve stem and the surrounding portion of the rubber cap on one side of the stem, and under the high temperature condition which prevails the all rubber unitary sealing member tends to become rigid and set in the distorted shape.

Other seals have been proposed in which a rubber sealing ring of uniform thickness has been disposed at the outer end of the guide between a pair of washers which in turn are held in position by a metal cap extending over the outer end of the guide, the valve stem reciprocating through the washers and the sealing ring and the opening provided in the top of the cap. Cost as well as effectiveness is of prime importance in this field and it is therefore an object of this invention to eliminate as many parts as possible and provide a seal which will be both inexpensive and effective.

The seal which is described herein comprises simply an elastomeric annular sealing ring having a thin center portion surrounded by a thicker peripheral bead, and a metal tubular retainer cap which intermediate its ends is expanded outwardly forming an inwardly opening radially extending concavity which is substantially semi-circular in cross section the purpose of which is to receive and provide a seat for the peripheral bead of the elastomeric ring. Below the said expanded portion the cap comprises a skirt which is adapted to be pressed over the upper end of a valve stem guide, and above the said expanded portion the cap comprises a top portion extending radially over the sealing ring part way toward its center and terminating in a curved annular edge portion which is angled upwardly away from the thin center portion of the sealing ring. The portion extending radially inward from the top of the expanded portion defines a stop just above the said expanded portion against which the sealing ring is positioned while, and after, its bead portion is seated in the said expanded portion during assembly of the sealing ring in the cap.

The skirt is indented at spaced intervals preferably with three spaced circumferentially aligned indents. Being spaced these indents do not have any sealing function but they serve the double purpose of aligning the tubular cap on the valve stem guide to prevent cocking of the cap when it is being pressed onto the valve stem guide, and providing functional engagement of the cap on the valve stem guide.

The invention will be best understood by reading the following description in connection with the drawings in which:

FIG. 1 is an exploded perspective view of an embodiment of the invention comprising an annular elastomeric member and a metal retainer cap, FIG. 2 is an elevational view partly cut away and in section showing the two part oil seal of FIG. 1 assembled and disposed around a valve stem at the outer end of a valve stem guide, FIG. 3 is a vertical section on an enlarged scale taken through the oil seal assembly of FIG. 2, and FIG. 4 is a horizontal section taken on the lines 4—4 of FIG. 2

DESCRIPTION

In the drawings there is shown a valve stem guide 10 such as is conventional for internal combustion engines, with the valve stem 12 extending through the valve stem guide and positioned so that its valve head 14 is slightly displaced from its seat 16 as it would be for example when the valve is moving downwardly and thus creating suction within the valve chamber which would tend to suck oil into the chamber through the valve stem guide if an effective oil seal were not provided at the outer end of the valve guide around the valve stem.

The seal which is disclosed herein is a two part assembly comprising, an annular elastomeric member 18 which has a thin flexible center portion 20 surrounded by a thicker peripheral bead 22 and a tubular retainer cap 24 an intermediate portion 26 of which is expanded outwardly forming an inwardly opening circular concavity 28 adapted to receive and seat the bead 22 of the elastomeric member 18.

The inside diameter of member 18 is less than the diameter of the valve stem 12 and when the valve stem is inserted through it the hole 19 defining the inner edge portion of member 18 is expanded and clings tightly to the valve stem as the latter moves up and down in the valve stem guide 10.

Below the intermediate expanded portion 26 of the cap 24 is a skirt portion 30 adapted to be disposed over and around the outer end of the guide 10, and above the expanded portion 26 is a top portion 32 extending radially inward, over the thin portion 20 of member 18, part way toward a valve stem 12 inserted through the oil seal assembly, and terminating in an edge portion 34 projecting axially upward in a direction away from the thin web portion 20 of member 18. The portion of the cap extending radially from the annular expanded portion 26 defines a downwardly projecting groove 36 which serves as a stop against which member 18 is placed when it is inserted into the cap in preparation for seating the bead 22 of member 18 in the circular concavity 28 provided by said expanded portion 26.

A number of circumferentially spaced indents 40, preferably three, are formed in the skirt portion 30 of the cap. These indents 40 have no oil sealing function but serve to align the cap on the guide and prevent cocking of the cap when the seal assembly is being pressed onto the valve guide. Further, the indents 40 provide frictional engagement between the cap and the valve stem guide, being deformed to a greater or lesser extent by the guide depending on slight variations in the outer diameter of the guide.

The skirt 30 of the cap member 24 is of such a length that when a seal assembly is in place on a valve stem guide the thin web portion 20 of seal member 18 will rest on the top of the valve stem guide, and the bead 22, the outer surface of which is partly surrounded by the expanded wall portion 28 of the cap, will extend around the upper end of the valve stem guide. The outer surfaces of such guides are often bevelled adjacent their upper edges, as for example with a bevel 42 shown in FIG. 3, in which case the bead 22 will be disposed between the portion 28 of the cap and the bevelled outer edge portion of the guide.

What I claim is:

1. A seal assembly for providing an oil seal at the outer end of a valve stem guide around a valve stem reciprocable axially of the guide, which comprises, an annular elastomeric member comprising a thin central web adapted to be disposed around the valve stem resting on the top of the guide, the thin central web being surrounded by a thicker peripheral bead disposed around the outer surface of the guide, and a tubular metal retainer cap comprising a skirt portion adapted to be disposed around the outer end of the guide, an intermediate portion which is expanded outwardly relative to the skirt portion forming an annular internal concavity of substantially the same diameter as said peripheral bead and adapted to receive said elastomeric member therein; and a radial portion extending from said expanded intermediate portion toward the axis of said tubular cap, the inner annular edge of said radial portion being upturned axially to form a smoothly rounded shoulder portion adjacent said thin central web when said elastomeric member is inserted into said metal retainer cap.

2. The assembly claimed in claim 1 in which the outer surface of the valve stem guide is bevelled at its upper end and the bead of the elastomeric member is held by the cap disposed around the bevelled outer surface of the guide.

3. The assembly claimed in claim 1 in which the inner diameter of the elastomeric member is less than the diameter of the valve stem.

4. The assembly claimed in claim 1 in which the skirt portion of the retainer cap is indented at angularly spaced intervals, to provide means for aligning the cap on the valve stem guide and to prevent any cocking of the cap during the assembly operation, and to provide frictional engagement between the skirt portion of the cap and the outer surface of the valve guide.

5. A two piece valve stem seal for preventing the passage of oil between a valve guide and a valve stem in an internal combustion engine which comprises, an elastomeric sealing ring having a thin central web apertured to receive and extend around a valve stem and a circular bead of greater thickness than the central web surrounding the outer periphery of the web, a retainer cap defining an annular opening portion adapted to receive the peripheral bead portion of the sealing ring, a skirt portion extending axially from the annular opening portion and adapted to be disposed over and around the upper end of the valve guide with the center of said annular opening portion on a level with the top of the valve guide, and a radial portion of said retainer cap extending toward the valve stem from said annular portion and terminating in an annular edge portion projecting axially in a direction away from the web portion of said elastomeric member.

6. The two piece valve stem seal claimed in claim 5 in which the radial portion of the cap defines an annular groove disposed between said annularly extended portion and the upwardly projecting edge portion.

7. The two piece valve stem seal claimed in claim 5 including means in the form of spaced apart indents in said skirt portion for aligning the cap on the valve stem guide to prevent cocking of the cap when the seal assembly is being disposed on the valve stem guide and to retain the seal assembly on the valve stem guide while the valve stem is reciprocated through it, said indents being such that they are deformed when the cap is pressed onto the valve stem guide providing frictional engagement between the cap and the valve guide.

* * * * *